July 12, 1949.  P. W. THORNHILL  2,476,228

TELESCOPIC SUSPENSION DEVICE FOR VEHICLES

Filed Sept. 21, 1944  2 Sheets-Sheet 1

Inventor
Peter Warborn Thornhill
by Stevens and Davis
his attorneys

July 12, 1949.  P. W. THORNHILL  2,476,228
TELESCOPIC SUSPENSION DEVICE FOR VEHICLES
Filed Sept. 21, 1944  2 Sheets-Sheet 2
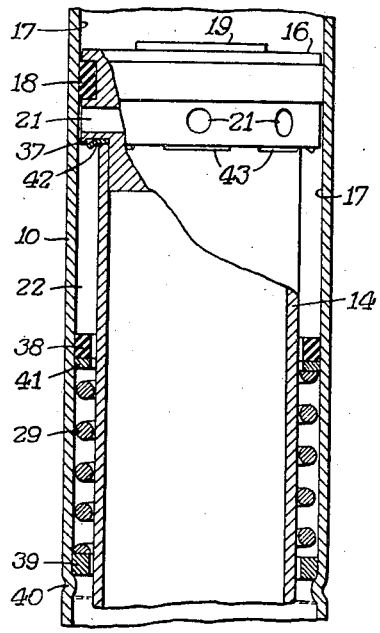
Fig. 4.
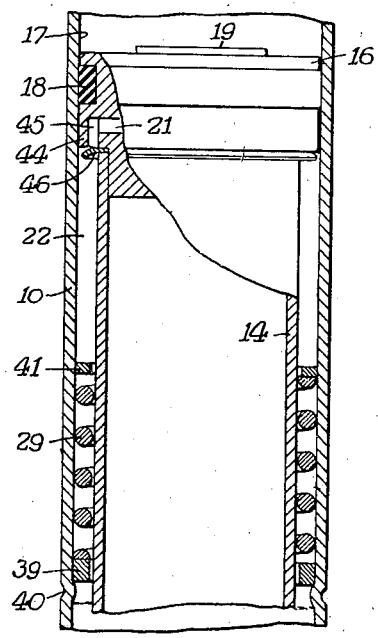
Fig. 5.
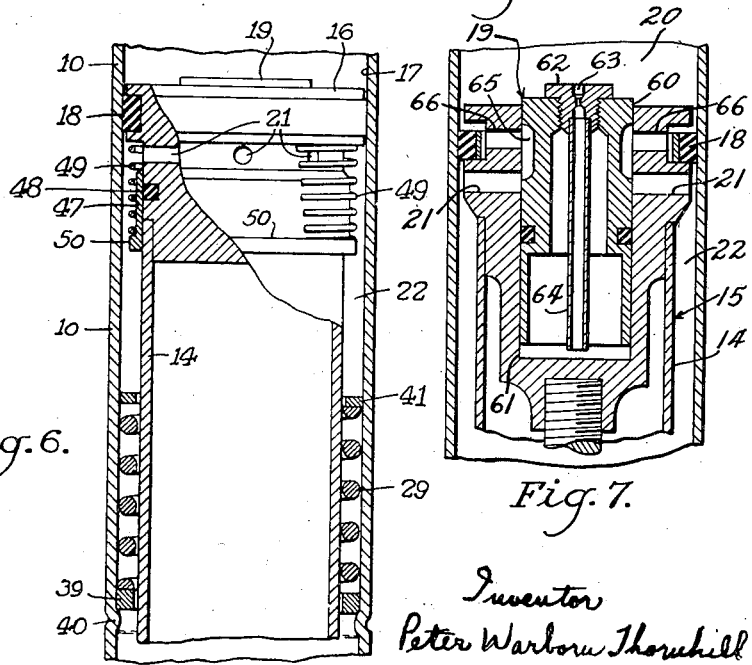
Fig. 6.
Fig. 7.
Inventor
Peter Warlow Thornhill
by Stevens and Davis
his attorneys Patented July 12, 1949

2,476,228

UNITED STATES PATENT OFFICE 2,476,228

TELESCOPIC SUSPENSION DEVICE FOR VEHICLES

Peter Warborn Thornhill, Leamington Spa, England, assignor to Levitation Limited Application September 21, 1944, Serial No. 555,151
In Great Britain September 2, 1943

7 Claims. (Cl. 267—64)

This invention relates to telescopic suspension devices for vehicles and especially to those in which the telescopic movement of the elements is damped by a fluid medium, such, for instance, as compressed gas, or liquid.

It is the object of the invention to provide an improved telescopic suspension device incorporating a simple but efficient means for checking the rebound or extension stroke. The invention is of particular utility in connection with the suspension device described in my application Serial No. 555,150, filed September 21, 1944, (corresponding to British Patent Application No. 14375/43), where compressed air or other gas is used as the resilient medium and also as the means for damping the telescopic movements of the elements. The improved means may, however, be used in connection with oleo-pneumatic suspension devices where compressed gas constitutes the resilient medium for sustaining the load and liquid is used for damping telescopic movements of the elements.

In a telescopic suspension device for a vehicle, according to the invention a chamber, which decreases in volume as the device lengthens, has the escape of fluid from said chamber controlled by valve means, which latter is normally open but is caused to close as the suspension device exceeds a predetermined length, thus trapping gas within said chamber so that further lengthening movement causes the pressure of said gas to be progressively raised, thereby creating substantial resistance opposing said lengthening movement.

The invention is illustrated by way of example in the accompanying diagrammatic drawings, in which:

Figures 4, 5 and 6 are fragmentary views, partly in section, showing three further modified forms of snubbing means; and Figure 7 is a view in vertical section showing in greater detail the damping valor that constitutes a part of the construction of Figure 1.

Figure 1:
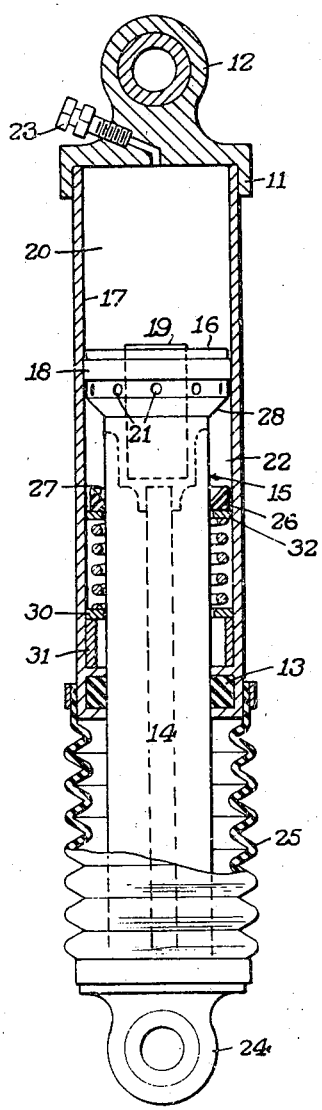
Figure 1 is an elevation, partly in section, showing a typical telescopic suspension unit incorporating the improved snubbing means.

The suspension device shown in Figure 1 is of the pneumatic type and comprises a cylinder 10, which is closed at its upper end by means of a cap 11 having an attachment lug 12. At its lower end the cylinder 10 is provided with an internal packing 13, which engages in a fluid-tight manner with the outside of the rod-like stem member 14 of a plunger indicated generally at 15. This plunger 15 also has at its upper end a piston head 16, which is just slightly smaller in diameter than the bore 17 of the cylinder 10 and is fitted with a circumferential packing 18 providing a fluid-tight seal between the outside of the piston head 16 and the bore 17. The piston head 16 is fitted with a damping valve device, which is indicated generally at 19 and can be of any form, such, for instance, as that described in the above-mentioned application. It forms a means of communication between the cylinder working space 20 and a series of passages 21 leading into an annular working space 22, which latter surrounds the stem portion 14 of the plunger 15. It will be noted that when the plunger 15 moves upwards within the cylinder 10 the cylinder working space 20 becomes reduced in volume, whereas the space 22 increases in volume, but to a lesser extent. The working spaces 20 and 22 are charged with compressed air or other gas through an inlet valve 23; the air or other gas acts as a resilient medium tending to extend the suspension unit with sufficient force to support the load on the device.

Upon reference to Figure 7 it can be seen that the damping valve device is comprised of a hollow piston valve 60 which makes a sliding fit in an appropriate socket 61 located in the upper end of the plunger 15. The upper face of the piston valve 60 is provided with an axial bore that is threaded to receive a bush 62 having a constricted passage 63 communicating at all times with space 20. Attached to and depending from bush 62 is a tube 64. The side of the piston valve 60 is provided with an annular groove 65 which, depending upon the vertical position of the piston valve 60 relative to the plunger 15, establishes communication between the ports 21 and ports 66 that extend out radially above the packing 18 in communication with the space 20. The construction of Figure 7 constitutes no part of the present invention and is fully described in application No. 555,150 filed September 21, 1944.

In operation the damping valve controls the rate of transfer of fluids to and from the spaces 20 and 22.

The lower part of the stem 14 is provided with a lug 24 for attachment to the wheel axle or equivalent, a tubular flexible boot 25 being provided to exclude dirt and other foreign matter from the outer sliding surface of the stem 14. When the vehicle is standing, or is running along a smooth road, the piston head 16 occupies approximately the position shown in Figure 1, the pressure exerted by the compressed air or gas downwards upon the piston head 16 over an area corresponding to the cross-sectional area of the stem 14 serving to support the gravitational load on the suspension device. When the vehicle is travelling and the wheel strikes a bump the plunger 15 rises within the cylinder 10, thus reducing the volume of the cylinder working space 20 and causing part of its air content to be transferred through the damping valve device 19 and passages 21 to the annular working space 22; the total volume of the spaces 20 and 22 is, however, less than before, and therefore the pressure of the air is increased to an extent depending upon the amount of shortening of the device. As a result of this the shortening stroke is followed by a lengthening or recoil stroke, the speed of which is usually governed by the damping valve device 19, which latter acts to restrict the return flow of air from the working space 22 back into the cylinder space 20.

It is found that when an exceptionally strong shock is received by the suspension device the maximum restraint which is offered by the damping valve 19 is insufficient to resist the following recoil stroke, and therefore there is danger of the suspension device becoming extended to its maximum length, with consequent noise and possibly damage to the suspension. With a view to avoiding this the improved suspension device incorporates snubbing means which come into action when the operative length of the suspension device exceeds a predetermined value, which value, of course, is greater than the normal length when the suspension device is bearing its static load. The snubbing means also become operative during an initial lengthening stroke, such as when the wheels drop down a curb.

Figure 2:
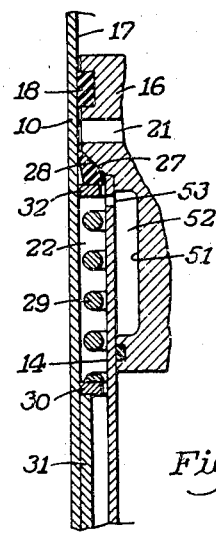
Figure 2 is a fragmentary sectional elevation, drawn to an enlarged scale and showing the snubbing means in action.

The snubbing device shown in Figures 1 and 2 comprises a ring 26, which is of somewhat triangular cross-section and is disposed within the working space 22. It is composed of relatively flexible material, such, for instance, as rubber or rubberised canvas, and it has an inwardly facing frusto-conical surface 27, the internal margin of which is a smooth sliding fit upon the stem 14; the outside diameter of the ring 26 is substantially smaller than the cylinder bore 17 so as normally to allow the free flow of air past the outside of the ring 26. That part of the piston head 16 below the passages 21 is shaped to provide a frusto-conical annular surface 28 adapted to engage with the corresponding surface 27 of the ring 26. Also disposed within the working space 22 is a relatively strong coiled compression spring 29, the lower end of which bears against an abutment ring 30, which latter is supported by a tubular spacing member 31. A metal washer 32, smaller in radial width than the working space 22, is interposed between the upper end of the spring 29 and the flat under surface of the ring 26.

As the recoil extension stroke of the suspension device proceeds and the above-mentioned predetermined length is exceeded, the frusto-conical surface 28 of the piston head 16 comes into engagement with the flexible ring 26, and owing to the resistance afforded by the spring 29 the upper part of said ring 26 is caused by the surface 28 to stretch until the ring 26 engages the cylinder bore 17 in a substantially fluid-tight manner, as will be seen more clearly in Figure 2. This seals the working space 22, so that the air or other gas which is trapped therein is progressively compressed so long as the recoil stroke continues, thus affording a substantial and increasing resistance to further lengthening of the suspension device. In addition, of course, the spring 29 becomes compressed by the recoil movement, and this also acts to arrest the recoil movement of the plunger 15.

Figure 3:
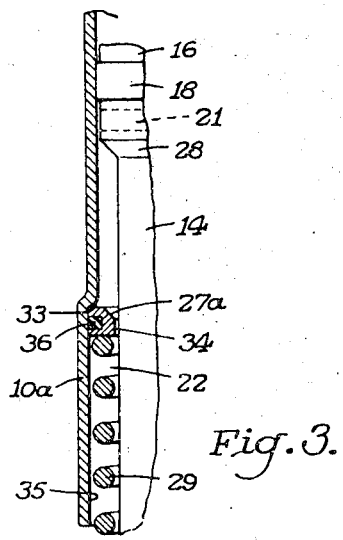
Figure 3 is a fragmentary sectional elevation showing a modified construction of snubbing means.

A somewhat similar construction of snubbing device is shown in Figure 3, and in this case the lower part of the cylinder 10 is slightly enlarged in diameter at 10a so as to form a shoulder 33. A ring 34 composed of metal or other relatively rigid material is slidably mounted within the bore 35 of the enlarged portion 10a, a fluid-tight seal between the outside of the ring 34 and said surface 35 being secured owing to the provision of a packing ring 36. The ring 34 has at its upper part an inwardly facing frusto-conical surface 27a, which is adapted to be engaged in a substantially fluid-tight manner by the frusto-conical surface 28 of the piston head 16. The ring 34 is normally held in engagement with the shoulder 33 by the coiled compression spring 29. When the suspension device becomes lengthened beyond a predetermined amount, as, for instance, during a violent recoil stroke, the frusto-conical surface 28 seats upon the ring 34 and consequently forms a seal, which traps the compressed air or other gas within the annular working space 22, so that further lengthening of the device causes the ring 34 to slide within the enlarged portion 10a of the cylinder and thus rapidly bring the air or other gas within the space 22 to a very high state of compression. During this movement the spring 29 is also compressed and thus tends to prevent further extension of the device.

It will be seen that in the arrangement shown in Figures 1 and 2 the ring 26, acting in conjunction with the piston head 16, constitutes a valve device which closes when the suspension device exceeds a predetermined length, while in Figure 3 the ring 34 co-operates with the piston head 16 to produce a similar effect. Some modified forms of valve device are shown in Figures 4 to 6, but in each case the effect is the same, namely to close and seal the annular working space 22 after a predetermined extension of the device has occurred.

In the arrangement shown in Figure 4 an endless circumferential lip 37 is formed upon the piston head 16 just below the passages 21 from the damping valve 19, said lip being adapted to engage in a fluid-tight manner by a ring 38. This ring, which is conveniently composed of rubber or rubberised canvas, slides snugly within the cylinder bore 17 so as to have a substantially fluid-tight fit therein. As before, a coiled compression spring 29 is provided and rests at its lower end upon a ring 39, which latter is supported by an internal shoulder 40 pressed into the cylinder tube 10; a washer 41 is interposed between the upper end of the spring 29 and the ring 38. The stem portion 14 of the plunger is tubular for convenience in construction, and where its upper end is fitted to the piston head 16 it is arranged to hold in position an annular stamping 42, which is composed of springy material and has a plurality of downwardly inclined tongues or fingers 43, which extend outwards nearly as far as the lip 37. As the piston head 16 moves downwards during lengthening of the suspension device, the ring 38 is engaged by the lip 37, the tongues 43 being deflected upwards. Therefore a fluid-tight seal is produced between the ring 38 and the lip 37, thus closing the annular working space 22. During the succeeding shortening stroke, as the spring 29 resumes its natural length, the tongues 43 lightly press the ring 38 away from the lip 37, thus breaking the seal and enabling the piston head 16 to leave the ring 38 behind.

In the construction shown in Figure 5 the piston head 16 is formed, below the packing ring 13, with a depending flange 44 defining an annular space 45 into which lead the passages 21 of the damping valve 19. An annular valve member 46 is secured to the piston head 16 by means of the stem tube 14, and is composed of springy material shaped so as to assume a position in which its outer margin is spaced from the lower edge of the flange 44, as shown in Figure 5. A coiled compression spring 29 is provided as before, and serves to support a washer 41 slidable in the cylinder tube 10. As the piston head 16 slides down the cylinder tube 10 during lengthening of the suspension device the annular valve member 46 comes into contact with the washer 41 and is deflected thereby so as to make a substantially fluid-tight seal against the lower edge of the flange 44. This, of course, seals the annular working space 22 from the damping valve 19 and rapidly arrests the extending movement of the device owing to the compression which takes place in the air within the space 22 and also in the spring 29.

Another form of valve device is shown in Figure 6, and in this case a sleeve 47 is slidably mounted upon the outside of the plunger stem 14, a sealing ring 48 being provided in order to prevent leakage between the sleeve 47 and said plunger stem. A coiled compression spring 49 bears at its upper end against the piston head 16, while its lower end engages a shoulder 50 upon the sleeve 47, said spring normally causing the sleeve 47 to be depressed so that its upper edge lies below the passages 21 leading to the damping valve 19. A coiled compression spring 29 is fitted within the lower part of the cylinder tube 10 and is fitted with a washer 41, so that when the device extends beyond a predetermined length the lower end of the sleeve 47 engages with the washer 41. Continued movement causes the spring 29 to be compressed and the piston head 16 passes downwards through the sleeve 47 until the latter completely closes the passages 21. This, of course, isolates the annular working space 22 so that further lengthening of the suspension device creates substantial increase in pressure in the air which is trapped within the space 22.

In suspension devices of the pneumatic type as described, it is usually desirable to insert a quantity of lubricating liquid, such as oil, to prevent wear of the parts and also to render the packing 13 as efficient and frictionless as possible. As there is some risk of this liquid accumulating within the annular working space 22, it may be desirable in some cases to provide an auxiliary space within which the air or other gas can be compressed when the snubbing device is in action. Thus in the construction shown in Figure 2, the stem 14 is tubular, and the piston head 16 is formed at its lower part with a wide circumferential groove 51, thus producing an annular auxiliary space 52 which is in permanent communication at its upper part with the working space 22 through one or more holes 53 in the stem 14. An auxiliary space of this nature can, of course, be readily provided in conjunction with any of the constructions illustrated.

It will be understood that various other modifications may be made, and that the invention is applicable to various forms of telescopic suspension device, such, for instance, as those which employ liquid as a damping medium. In this case, however, the annular working space would need to be placed in communication with the usual compressed gas chamber, for the cylinder space normally contains liquid. The invention is, moreover, applicable to the telescopic struts used for the undercarriages of aircraft, although it is primarily intended for use in suspension devices of motor vehicles.

What I claim is:

1. A telescopic suspension device comprising a cylinder closed at one end, a packing gland at the other end, a piston slidable in said cylinder, a stem of reduced diameter extending axially from the piston and passing slidably through said packing gland, said cylinder thus having a cylinder working space between the piston and the closed end and an annular working space surrounding the stem between the back of the piston and the packing gland, compressed air substantially filling both of said working spaces, a damping valve device disposed within the piston, damping valve ports in the piston, said damping valve providing restricted connection between the cylinder working space and the annular working space by way of said damping valve ports during normal reciprocation of the piston, an annular snubbing valve member slidably fitting within the cylinder bore between the piston and the packing gland, and annular seating means on the piston, between the damping valve ports and the packing gland, adapted to engage the snubbing valve member when the suspension device becomes extended beyond a predetermined length, the snubbing valve member then completely sealing the annular working space so that the compressed gas disposed therein is trapped and is rapidly compressed by continued extending movement of the suspension device.

2. A telescopic suspension device comprising a cylinder closed at one end, a packing gland at the other end, a piston slidable in said cylinder, a stem of reduced diameter extending axially from the piston and passing slidably through said packing gland, said cylinder thus having a cylinder working space between the piston and the closed end, and an annular working space surrounding the stem between the back of the piston and the packing gland, compressed gas substantially filling both of said working spaces, a damping valve device disposed within the piston, damping valve ports in the piston, said damping valve providing restricted connection between the cylinder working space and the annular working space by way of said damping valve ports during normal reciprocation of the piston, an annular snubbing valve member slidably fitting within the cylinder bore between the piston and the packing gland, a support member within the annular working chamber, which support is axially compressible, and annular seating means on the piston, between the damping valve ports and the packing gland, adapted to engage the snubbing valve member when the suspension device becomes extended beyond a predetermined length, the snubbing valve member then completely sealing the annular working space so that the compressed gas disposed therein is trapped and is rapidly compressed by continued extending movement of the suspension device, the support member normally holding the snubbing valve member in a prescribed position determining the commencement of the snubbing action.

3. A telescopic suspension device as claimed in claim 2, wherein the support member comprises a coiled compression spring which is normally free to assume its natural full axial length.

4. A telescopic suspension device comprising a cylinder closed at one end, a packing gland at the other end, a piston slidable in said cylinder, a stem of reduced diameter extending axially from the piston and passing slidably through said packing gland, said cylinder thus having a cylinder working space between the piston and the closed end, and an annular working space surrounding the stem between the back of the piston and the packing gland, compressed gas substantially filling both of said working spaces, a damping valve device disposed within the piston, damping valve ports in the piston leading into a narrow annular clearance space between the piston and the cylinder, said damping valve providing restricted connection between the cylinder working space and the annular working space by way of said damping valve ports and annular clearance space during normal reciprocation of the piston, an annular snubbing valve member slidably fitting within the cylinder bore between the piston and the packing gland, and annular seating means on the piston, between the damping valve ports and the packing gland, adapted to engage the snubbing valve member when the suspension device becomes extended beyond a predetermined length, the snubbing valve member then bridging the said clearance space and completely sealing the annular working space so that the compressed gas disposed therein is trapped and is rapidly compressed by continued extending movement of the suspension device.

5. A telescopic suspension device as claimed in claim 1, wherein the annular snubbing valve member comprises a ring of soft resilient material slidably engaging the cylinder, and a rigid metal washer engaging that side of the ring nearest the packing gland, the opposite side of said resilient ring being engageable with the piston to seal the annular working space from the damping valve and cylinder working space.

6. A telescopic suspension device as claimed in claim 1, wherein a plurality of resilient tongues disposed adjacent the seating means on the piston act to urge the snubbing valve member out of engagement with said seating means during shortening of the suspension device.

7. A telescopic suspension device as claimed in claim 1, wherein the annular snubbing valve member comprises a ring of soft resilient material having a triangular shape in cross section, and a rigid metal washer engaging that side of the ring nearest the packing gland, the opposite side of said ring being of hollow frusto-conical shape, the seating means on the piston being frusto-conical to correspond, so that as the piston reaches the snubbing valve member during extension of the device, said seating means spreads the resilient ring outwards into sealing engagement with the cylinder.

PETER WARBORN THORNHILL.

REFERENCES CITED

The following references are of record in the file of this patent:

UNITED STATES PATENTS

| Number | Name | Date |
| --- | --- | --- |
| 1,886,712 | Messier | Nov. 8, 1932 |
| 2,089,657 | Mercier | Aug. 10, 1937 |
| 2,098,398 | Mercier | Nov. 9, 1937 |
| 2,275,462 | Parilla | Mar. 10, 1942 |
| 2,372,137 | Thornhill | Mar. 20, 1945 |

FOREIGN PATENTS

| Number | Country | Date |
| --- | --- | --- |
| 49,470 | France | Jan. 17, 1939 |
| 408,592 | Great Britain | Apr. 5, 1934 |